United States Patent [19]

Fletcher et al.

[11] 3,744,555
[45] July 10, 1973

[54] AUTOMATIC CONTROL OF LIQUID COOLING GARMENT BY CUTANEOUS AND EXTERNAL AUDITORY MEATUS TEMPERATURES

[75] Inventors: James C. Fletcher, Administrator of the National Aeronautics and Space Administration with respect to an invention of; Clay W. G. Fulcher, Houston, Tex.

[73] Assignee: General Electric Company, New York, N.Y.

[22] Filed: Nov. 12, 1971

[21] Appl. No.: 198,355

[52] U.S. Cl............... 165/46, 62/259, 73/342, 128/402
[51] Int. Cl.............. F28f 7/00, A61f 7/00
[58] Field of Search............... 165/46, 63; 126/204; 62/259; 128/1 B, 399, 400, 402; 73/342; 236/91

[56] References Cited
UNITED STATES PATENTS

| | | | |
|---|---|---|---|
| 3,648,765 | 3/1972 | Starr | 62/259 X |
| 3,635,216 | 1/1972 | Curtis | 128/402 X |
| 3,625,279 | 12/1971 | Mayo | 165/63 X |
| 3,051,180 | 8/1962 | Adams-Ray et al. | 128/402 X |
| 3,363,087 | 1/1968 | Buxbaum et al. | 128/399 X |
| 3,338,233 | 8/1967 | Grosholz et al. | 128/1 B |
| 3,648,764 | 3/1972 | Starr | 73/362 R |
| 2,691,889 | 10/1954 | Dion et al. | 73/34 Z |
| 3,581,570 | 6/1971 | Wortz | 128/2 H |

Primary Examiner—Manuel A. Antonakas
Attorney—Allan E. Amgott, Raymond H. Quist, Henry W. Kaufmann, Frank L. Neuhauser, Oscar B. Waddell and Joseph B. Forman

[57] ABSTRACT

Automatic control apparatus for a liquid cooling garment responsive to actual physiological needs during work and rest periods of a man clothed in the liquid cooling garment. Four skin temperature readings and a reading taken at the external portion of the audiotry meatus are added and used as the control signal for a temperaure control valve regulating inlet water temperature for the liquid cooling garment. The control apparatus may comprise electronic circuits to which the temperatures are applied as control signals and an electro-pneumatic transducer attached to the control valve.

8 Claims, 3 Drawing Figures

CLAY W.G. FULCHER
INVENTOR.

CLAY W.G. FULCHER
INVENTOR.

BY Edward K. Kim
ATTORNEY

AUTOMATIC CONTROL OF LIQUID COOLING GARMENT BY CUTANEOUS AND EXTERNAL AUDITORY MEATUS TEMPERATURES

ORIGIN OF THE INVENTION

The invention described herein was made in the performance of work under NASA contract and is subject to the provisions of section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to apparatus for maintaining the temperature of the human body at levels suitable for the physiological performance required. In particular, it concerns apparatus for controlling the environment of an individual in a closed space, such as by controlling the inlet liquid temperature of a liquid cooling garment.

The invention is particularly directed to temperature control of liquid cooling garments to be used by astronauts in extravehicular activity. It may also be useful in controlling body temperature in hospital intensive care units or in the treatment of patients suffering from diseases characterized by high fevers.

2. Brief Description of the Prior Art

In the past few years man has made great strides in exploring outer space. The NASA space program has been characterized by continuous and sometimes spectacular advances. Of course, many problems have been encountered in such a program.

One such problem, recognized in the Gemini space program, was the moderate loss of exercise capacity and high metabolic cost of extravehicular activity in the zero gravity environment. It was observed that astronauts were unable to judge their own body thermal state when working in reduced gravity space environments, particularly when extravehicular. The Gemini spacesuit was gas-cooled and was designed for lower levels of metabolic heat production than the system was subjected to during some extravehicular activities. Complications encountered included heavy sweating and visor fogging.

Recognition of the deficiencies of gas-cooled suits resulted in the design of liquid cooling garments which are now used in the Apollo space program. The present Apollo garment features a network of polyvinyl chloride tubing stitched to the inside of a long sleeved undergarment worn by the crewman beneath his pressure suit. A continuous flow of temperature controlled water is supplied through the liquid cooling garment by the Apollo Portable Life Support System. Temperature control of the inlet water to the liquid cooling garment is achieved using a manually controlled three-position valve.

Manual control of pressure suit cooling has proven to be adequate during Apollo flights. However, test results have suggested a need for improved cooling control. Premature or excessive cooling causes cutaneous vasoconstriction and sensations of chilling, combined with subjective feelings of excessive internal heat buildup sometimes accompanied by heavy sweating and/or cramping of muscles. If insufficient cooling is supplied, or if sufficient cooling is not supplied in time, heat storage begins and sweating and discomfort build up quickly. In addition to providing more optimum cooling at all times, automatic control of cooling would free the crewman of one additional task. It is very likely that some form of automatic control of pressure suit cooling will be used in future space mission extravehicular activities.

Several methods of automatically controlling the temperature of liquid cooled clothing have been investigated. One method proposed continuously monitors oxygen consumption as a signal to control cooling. Another is based upon change in cooling water temperature across the man with a skin temperature feedback; another upon heart rate with feedback proportional to change in cooling water temperature across the man; and another on heart rate alone. See Webb, Paul; Troutman, S. J., Jr.; and Annis, J. F., "Automatic Cooling in Water-Cooled Spacesuits," Aerospace Med. 41(3): 269-277. None of these methods has been found to be completely satisfactory. Reliable achievement of subjective body comfort with an automatic device is most difficult to obtain due to complexities of the human body, many of which are not well understood.

SUMMARY OF THE INVENTION

In the present invention, control apparatus is provided for regulating the inlet water temperature for a liquid cooling garment. The control is automatically responsive to actual physiological needs during work and rest periods. The temperature of the wall of the external auditory meatus and four averaged, unweighted skin temperatures are used as input signals to an electro-pneumatic transducer to control a diverter valve in the liquid cooling loop of the liquid cooling garment.

Investigations have concluded that change in mean body temperature is an effective index of heat tolerance since, under transient heat loads, mean body temperature rises as a linear function of heat stress. Consideration of the physiological functions of thermal regulation, man's responses to work under different environmental conditions, and related data leads to the conclusion that reliable control of man's environment in a liquid cooling garment should be keyed to minimizing heat stress, changes of which are reflected by changes in mean body temperature. Such control is based on actual physiological needs, without sensitivity to emotions and other variables which indirect methods are subject to. Some anticipation is also needed in the cooling control to counter thermal inertia of the human body. Such inertia can lead to build up of stored heat and sweating if cooling is delayed sufficiently after onset of work, for example. Thus, the control apparatus of the present invention is designed to control liquid cooling garment inlet water temperature based upon mean body temperature and its time rate of change.

BRIEF DESCRIPTION OF THE DRAWINGS

In the description which follows reference will be made to the accompanying drawings in which.

DESCRIPTION OF A PREFERRED EMBODIMENT

Figure 1:
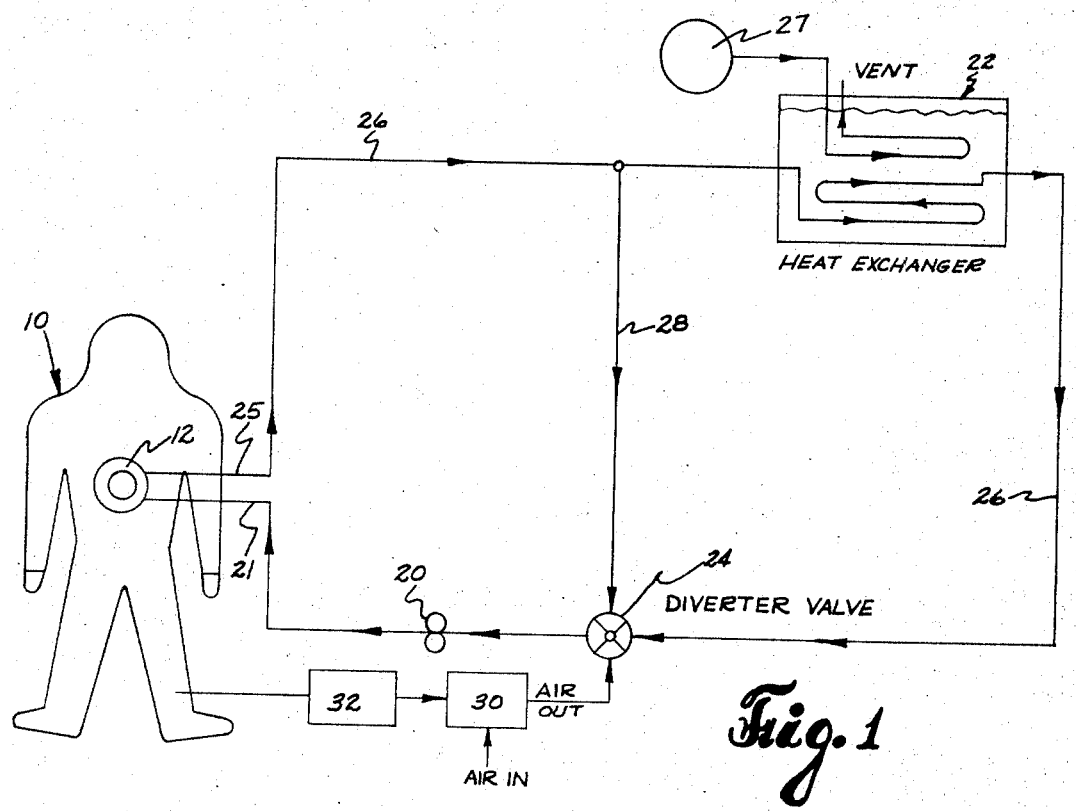
FIG. 1 is a schematic diagram of a cooling system for controlling the inlet temperature of the cooling fluid in a liquid cooling garment according to a preferred embodiment of the invention.

Referring now to FIG. 1, there is shown a liquid cooling garment, generally designated by the reference numeral 10, which might be used by an astronaut. Connected by a suitable connector 12 to the garment is a liquid cooling system for circulating cooled liquid through the garment for cooling a man according to actual physiological needs.

The cooling system may comprise a circulating pump 20, a heat exchanger 22 and a diverter valve 24 connected in a fluid loop 26. A bypass line 28 is provided in the loop 26 connecting the inlet side of the heat exchanger 22 with the diverter valve 24. The diverter valve 24 may be connected to an electro-pneumatic transducer 30 for operation of the diverter valve 24 according to control signals from a controller 32. If desired, different means, other than an electro-pneumatic transducer, may be used to actuate the diverter valve 24. Temperature input signals are supplied to the controller 32 from temperature indicators (not shown) attached to the body of the wearer of the liquid cooling garment 10. The controller 32 and temperature indicators will be more fully described hereafter.

In operation, a cooled fluid enters the garment 10 by way of the inlet 21 and connector 12 where it absorbs metabolic heat given off by the wearer. The heated fluid is then returned to the cooling loop 26, via connector 12 and outlet 25, where at least a part of the heated fluid is circulated through the heat exchanger 22. A source of refrigerant 27, such as liquid nitrogen, may be used as an exchange fluid in the heat exchanger 22. Depending on signals from controller 32, the electro-pneumatic transducer 30 positions diverter valve 24 to allow passage of some of the heated fluid through bypass line 28. The diverter valve is thus positioned so that the proper proportion of heated fluid and cooled fluid from the discharge side of heat exchanger 22 is combined for recirculation through the cooling garment 10. The diverter valve 24 can be provided with manual adjustments, if desired, for emergency use or fine adjustment for the individual characteristics of the particular person wearing the garment 10.

As previously stated, it has been determined that the mean body temperature is an effective index of heat tolerance. There are many different "core" or "central" temperature measurements in the human body and the same applied to skin temperature. They are different not only in value, but they respond in different ways and with different rates to disturbance functions such as work, external cooling, and other factors. Rectal temperature has been used in estimating mean body temperature, but rectal temperature instrumentation promotes a feeling of discomfort and introduces unique design problems in providing flight equipment. Other methods have used the tympanic membrane, external auditory meatus and oral temperatures for assessing heat stress in humans. For an example of one of such measurements, see U.S. Pat. No. 3,054,397 to Benzinger. Other possibilities exist for measuring central temperatures but they are not practical for use in space activities.

Figure 2:
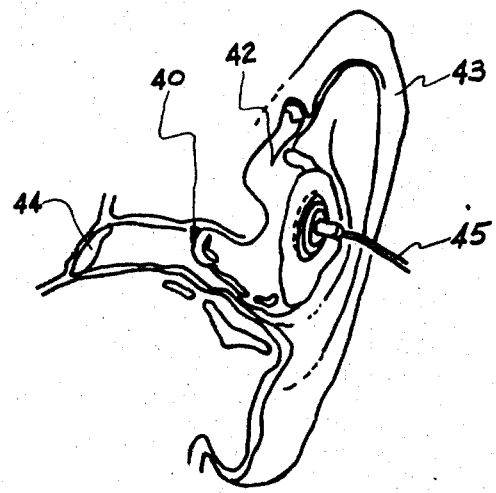
FIG. 2 is a schematic of an ear mold and thermistor used to measure temperature of the ear canal in the present invention.

Ear canal temperature measurement is more comfortable than either tympanic membrane or rectal measurements, and more reliable than oral measurements which are affected by respiration and talking. As illustrated in FIG. 2, the present invention utilizes a thermoelectric device, such as a thermistor 40 or a thermocouple which may be attached to an ear mold 42 for placement in the ear 43. The thermistor 40 is placed for measuring the temperature of the external meatus and is therefore away from the tympanic membrane 44. An electrical lead wire 45 connects the thermistor 40 to an electronic controller (32 in FIG. 1) to be described hereafter.

In the present invention, average skin temperature is also supplied to the controller. For operational reasons, it is desirable to minimize the number of skin sensors, and for the present invention, four such sensors have been arbitrarily selected. Convenient locations are the right shoulder, right chest, right bicep, and right lower abdomen. Of course, other locations and numbers of sensors could be used.

Figure 3:
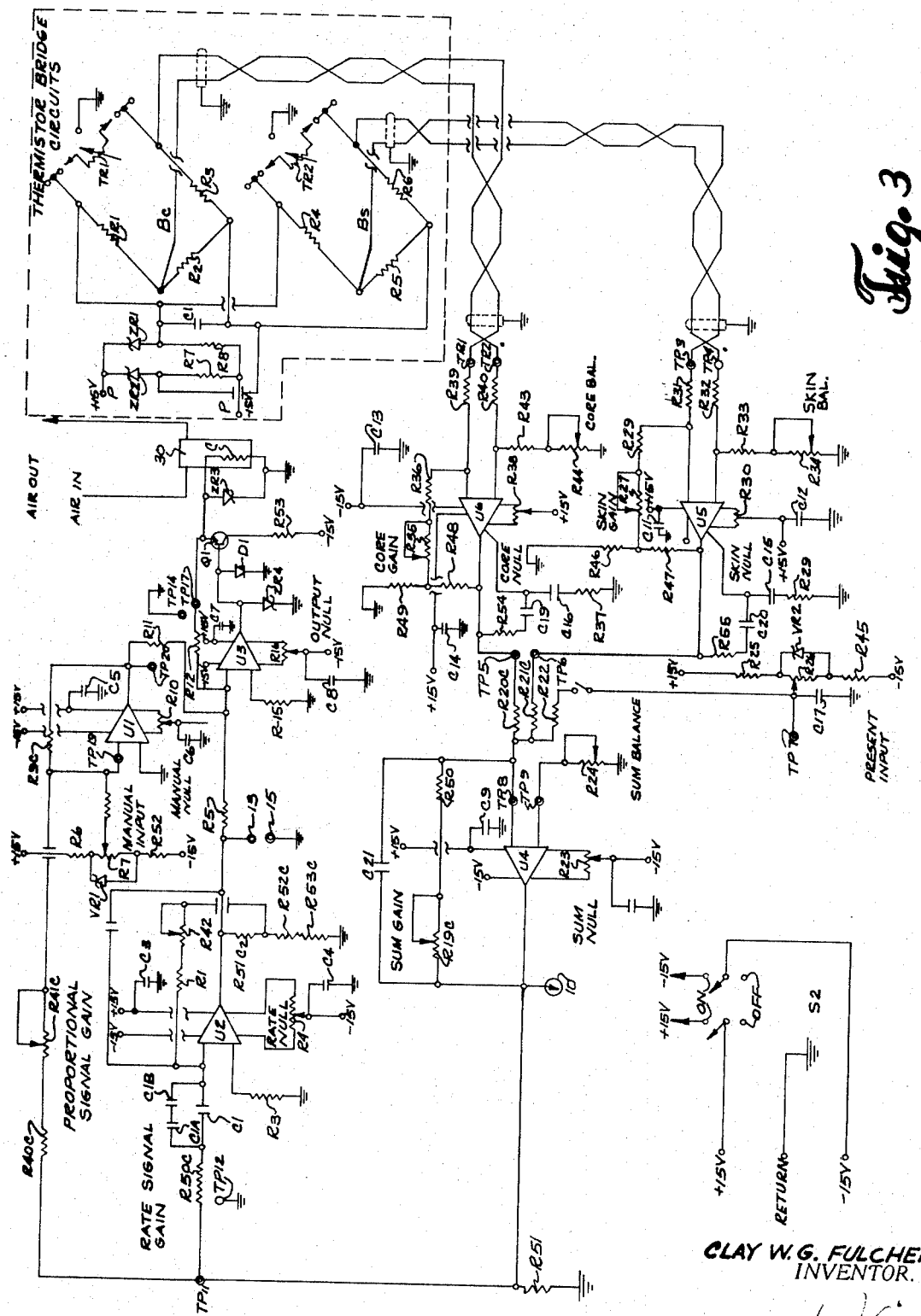
FIG. 3 is an electrical schematic diagram of a controller for use with the present invention.

Referring now to FIG. 3, an electrical system for the controller 32 will be described in conjunction with electro-pneumatic transducer 30. The controller may comprise temperature sensing bridges $B_c$ amd $B_s$, amplifiers U1, U3, U4, U5 and U6, differentiator U2 and the current-to-air transducer 30. Power for the thermistor bridge circuits $B_c$ and $B_s$ is obtained from negative and positive 15-volt regulated power supply P-P and is further conditioned by diodes ZR1 and ZR2 and resistors R7 and R8 until 10 volts D.C. is provided to each bridge.

The temperature sensing circuit is composed of two bridges, a core bridge $B_c$ and a skin bridge $B_s$. Core bridge output is designed to go positive if the astronaut's body temperature exceeds 98.6° F and negative if it drops below 98.6° F. Skin bridge output is designed to go positive if the astronaut's skin temperature exceeds 91.2° F and negative if it drops below 91.2° F. In other words, the core bridge is designed to balance at 98.6° F and the skin bridge is designed to balance at 91.2° F. The core bridge $B_c$ comprises the three resistors R1, R2, R3 and a single thermistor TR1 attached to the ear mold as shown in FIG. 2. The skin bridge comprises resistors R4, R5, R6 and four thermistors TR2 connected in series. These thermistors TR2 are attached to the skin as previously described. Outputs from the bridges $B_c$ and $B_s$ are applied to bridge and summing amplifier circuits as shown.

U5 and U6 are high input impedance, stable, operational amplifiers used for amplifying the temperature sensing bridge outputs. Feedback controlling potentiometers R35 and R27 are provided so that the gain of each amplifier can be adjusted, say between X5 and X15. Potentiometers R34 and R44 are used to balance the input impedance of each bridge amplifier and to minimize drift. Resistance values of each may be chosen so that the circuit is balanced when their dial readings are the same as their respective gain controls R27 and R35.

Outputs from the bridge amplifiers U5 and U6 are coupled through resistors R20C and R21C into summing amplifier U4. U4 is a stable operational amplifier whose output is the function of the inputs through resistors R20C, R21C, R22 and the gain setting potentiometer R19. Potentiometer R19 may be selected so that when there is a preset input through resistor R22, gain may be selected from say X6 to X9.33. Preset input through resistor R22 is an offset adjustment to permit bridge outputs to be zeroed for each astronaut, assuming all do not have body and skin temperatures of 98.6° F and 91.2° F at ambient conditions and thermal equilibrium. Negative and positive inputs are provided for both higher and lower temperatures. This may be accomplished through a voltage divider network consisting of resistors R25, R26, R45 and Zener diode VR2. The summing balance potentiometer R24 minimizes drift.

Outputs from the summing amplifier U4 are fed to the circuits U1 and U2. U2 is used as a differentiator. U1 may have a gain capability of X1 to X6. The output of differentiator U2 is applied to a summing driver circuit U3. U3 sums the rate of temperature signal change from U2 and a manual override input from U1 plus a temperature proportional signal from U1. The manual input provides an astronaut override capability. U3 provides the drive current to power transistor Q1 and has unity gain between its input and the emitter of transistor Q1. Diode ZR4 limits the output of Q1 to minus 10 volts peak and diode D1 clamps it to prevent a positive output.

Transistor Q1 provides the power gain (10 ma to 50 ma) necessary to drive the current-to-air transducer 30. Manual input is required to set the initial conditions of 10 milliamperes. Diode ZR3 protects the transducer from extreme currents by holding a 9.1 volt maximum across the load coil C.

Following is an electrical parts list for the electrical components shown in FIG. 3. Each part is identified by the reference letters and numerals shown in FIG. 3.

ELECTRICAL PARTS DATA LIST

| Reference Number | Part Name | Rating-Remarks |
|---|---|---|
| R30 | Pot. Trim | 100K Bourns 3052P |
| R38 | Pot. Trim | 100K Bourns 3052P |
| R23 | Pot. Trim | 10K Bourns 3052P |
| R4 | Pot. Trim | " |
| R10 | Pot. Trim | " |
| R16 | Pot. Trim | " |
| R35 | Pot. 10 Turn | 500K IRC HD150 |
| R44 | Pot. 10 Turn | 500K IRC HD150 |
| R27 | Pot. 10 Turn | 500K IRC HD150 |
| R34 | Pot. 10 Turn | 500K IRC HD150 |
| R39 | Resistor ⅛w | 499K 1% RN550 IRC CEA T-O |
| R40 | Resistor ⅛w | 499K 1% RN550 IRC CEA T-O |
| R31 | Resistor ⅛w | 499K 1% RN550 IRC CEA T-O |
| R32 | Resistor ⅛w | 499K 1% RN550 IRC CEA T-O |
| R36 | Resistor ⅛w | 249K 1% RN55D IRC CEA T-O |
| R28 | Resistor ⅛w | 249K 1% RN55D IRC CEA T-O |
| R33 | Resistor ⅛w | 255K 1% RN55D IRC CEA T-O |
| R43 | Resistor ⅛w | 255K 1T RN55D IRC CEA T-O |
| R37 | Resistor ¼w | 27¼ 5% carbon |
| R29 | Resistor ¼w | 27¼ 5% carbon |
| C15 | Capacitor | 0.033 50V 10% Aerovox MC605A 102RK |
| C16 | | 0.033 50V 10% Aerovox MC605A 102RK |
| R20 | Resistor ¼w | 3010 RN60 B/D IRC CEB T-O |
| R22 | Resistor ¼w | 3010 RN60 B/D IRC-CEB T-O |
| R25 | Resistor ¼w | 750 RN60 B/D IRC CEB T-O |
| R45 | Resistor ¼w | 750 RN60 B/D IRC CEB T-O |
| VR2 | Zener diode | IN965B TI 15V 400MW |
| S1 | Switch | Toggle C&K Components, Inc. 7101 |
| R19 | Trim Pot. 10T | 25K IRC-HD150 |
| R24 | Trim Pot. 10T | 2.5K IRC HDL50 |
| C17 | Capacitor | 0.01mf CR05-06 Aerovox MC51C103RK |
| C11 | Capacitor | 0.01mf CR05-06 Aerovox MC51C103RK |
| C13 | Capacitor | 0.01mF CR05-06 Aerovox MC51C103RK |
| C14 | Capacitor | 0.01mf CR05-06 Aerovox MC51C103RK |
| C12 | Capacitor | 0.01mf CR05-06 Aerovox MC51C103RK |
| C10 | Capacitor | 0.01mf CR05-06 Aerovox MC51C103RK |
| C3 | Capacitor | 0.01mf CR05-06 Aerovox MC51C103RK |
| C4 | Capacitor | 0.01mf CR-5-06 Aerovox MC51C103RK |
| C5 | Capacitor | 0.01mf CR-5-06 Aerovox MC51C103RK |
| U1 | Integrated Circuit | Fairchild U637741393 |
| U2 | Integrated Circuit | Fairchild U637741393 |
| U3 | Integrated Circuit | Fairchild U6E7741393 |
| U4 | Integrated Circuit | Fairchild U6E7741313 |
| U5 | Integrated Circuit | Fairchild U5B7725333 |
| U6 | Integrated Circuit | Fairchild U5B7725333 |
| C6 | Capacitor | 0.01mf CK05-06 Aerovox MC51C 103RK |
| C7 | Capacitor | 0.01mf CK05-06 Aerovox MC51C 103RK |
| C8 | Capacitor | 0.01mf CK05-06 Aerovox MC51C 103RK |
| C9 | Capacitor | 0.01mf CK05-06 Aerovox MC51C 103RK |
| R46 | Resistor ⅛w | 10K 1% ⅛w IRC CEA- |
| R49 | Resistor ⅛w | 10K 1% ⅛w IRC CEA- |
| R47 | Resistor ⅛w | 90.9K 1% IRC CEA T-O |
| R48 | Resistor ⅛w | 90.9K 1% IRC CEA T-O |
| R26 | Pot. 10 T | 10K IRC HD 150 |
| R7 | Pot. 10T | 5K IRC HD150 |
| R6 | Resistor ¼w | 402ΩIRC RN60B/D ¼w |
| VRL | Zener diode | IN961B |
| R54 | Resistor | 270Ω ¼w Carbon 5% |
| R55 | Resistor | 270Ω ¼w Carbon 5% |
| C19 (C20) | Capacitor | 0.001mf |
| R50 | Resistor | 3010Ω RN60B/D IRC |
| S2 | Switch | Toggle DPDT. 28, 1 amp |
| R51 | Resistor | 10K RN55D IRC CEA-TO |
| R2 | Resistor | 1K RN55D IRC CEA-TO |
| C18 | Capacitor | 1.0mf Component Research Co. 03PG105DN |
| R8 | Resistor | 10K RN55D IRC CEA-TO |
| R7 | Pot. 10T | 10K IRC HD150 |
| R9 | Resistor ⅛w | 13.3K RN55D IRC CEB-TO |
| R6 | Resistor ¼w | 750Ω RN60B/D IRC CEB-TO |
| R52 | Resistor ¼w | 750Ω RN60B/D IRC CEB-TO |
| R11 | Resistor ⅛w | 10K RN55D IRC CEA-TO |
| R5 | Resistor ⅛w | 10K RN55D IRC CEA-TO |
| R12 | Resistor ¼w | 10K ¼w Carbon 5% |
| R15 | Resistor ¼w | 2.5K RN60B/D IRC-CEB-TO |
| R3 | Resistor ⅛w | 175K |
| R40 | Resistor ⅛w | 100K |
| R1 | Resistor ⅛w | 100K |
| R41 | Pot. 10T | 500K IRC HD-150 |
| R42 | Pot. 10T | 500K IRC HD-150 |
| C1 | Capacitors | 2–1mf<br>2–5mf<br>2–20mf |
| C2 | Capacitors | 2–1mf<br>2–5mf<br>2–20mf |
| D1 | Diode | IN4001 |
| Q1 | Transistor | AN4234 |
| ZR3 | Diode | IN3788 |
| R53 | Resistor | 100Ω, 1 watt Carbon |
| TP1-TP20 | | Test Points |
| R21A | Resistor ⅛w | 6040Ω RN55 IRC CEA TO |
| ZR4 | Diode | IN758A |
| C21 | Capacitor | 0.9omf Non-polarized |
| R50C | Resistor | 100K |
| R40C | Resistor ⅛w | 100K |
| R41C | Pot. 10T | 500K IRC HD-150 |
| R51C | Resistor | 10K |
| R52C | Resistor | 200Ω |
| R53C | Resistor | 36Ω |
| R54 | Resistor | 200K |
| TR1 | Thermistor | YS1-44011 100K at 25°C |
| TR2 | Thermistor | 4 ea YSI 44011 in series ea 100K at 25°C |
| R1 | Resistor ⅛w | 59K 1% RN55D |
| R2 | Resistor ⅛w | 59K 1% RN55D |
| R3 | Resistor ⅛w | 59K 1% RN55D |
| R4 | Resistor ⅛w | 280K 1% RN55D |
| R5 | Resistor ⅛w | 280K 1% RN55D |
| R6 | Resistor ⅛w | 280K 1% RN55D |
| R7 | Resistor ⅛w | 2.15K 1% RN60B/D |
| R8 | Resistor ⅛w | 2.26K 1% RN60B/D |
| Z1 | Zener Diode | IN968B Motorola |
| Z2 | Zener Diode | IN961B Motorola |
| C1 | Capacitor | 0.01mf CK05-06 Aerovox MC51C103RK |
| 30 | Transducer | Model 69Ta-2A Current to Air Transducer-Foxboro Co. Foxboro, Mass. |

In summary, the bridge circuit output signals are amplified by amplifiers U6 and U5 and then amplified and summed by amplifier U–4 to yield a voltage proportional to "mean body temperature." The weight given each temperature, ear and skin, is determined by the gain settings for U5 and U6. A voltage proportional to the desired mean body temperature set point is provided by the "preset" circuit. The output of the summing amplifier U4 is fed into amplifier U2 whose output is proportional to time rate of change of mean body temperature and into U1 whose output is proportional to mean body temperature. The output of U1 and U2 are summed at the input to U3, an inverting amplifier. A "manual input," or bias, can be introduced by the potentiometer R7. The output of amplifier U3 is fed into the electro-pneumatic transducer 30 whose output may be a 3–15 psig air source with pressure proportional to input voltage. This air source controls the flow through a diverter valve 24 in FIG. 1. Changes in core and skin temperature are amplified, summed, and converted to a diverter valve command proportional to the deviation of the summed signal from a set point value and to the rate of change of the summed signal from its set point. The electro-pneumatic transducer 30 and diverter valve 24 act as the links between the controller 32 and the fluid system shown in FIG. 1.

Although only one preferred embodiment of the invention has been described herein, many other variations will be apparent to those skilled in the art. It is therefore intended that the scope of the invention be limited only by the claims which follow.

I claim:

1. Apparatus for thermal regulation of a man in a closed space environment comprising:
   a. fluid loop means connected to said environment for circulating fluid through said environment;
   b. heat exchanger means connected to said loop means for cooling at least a portion of said fluid;
   c. bypass means in said loop means for allowing a portion of said fluid to bypass said heat exchanger means;
   d. valve means connected to said loop means and said bypass means for proportioning the flow of said fluid through said heat exchanger means and said bypass means;
   e. temperature sensing means adapted for connection to the external auditory meatus and the skin of said man and for producing signals indicative of the temperatures sensed; and
   f. controller means connected to said valve means for receiving said signals and for positioning said valve means in accordance with the core and skin temperatures and the rate of change of temperature.

2. Apparatus as set forth in claim 1 in which said temperature sensing means is a thermistor.

3. Apparatus as set forth in claim 1 in which said temperature sensing means is a thermocouple.

4. Apparatus for controlling the temperature of cooling liquid circulated through a liquid cooling garment worn by a man comprising:
   a. means connected to said garment for circulating said liquid through said garment;
   b. means connected to said circulating means for cooling at least a portion of said liquid;
   c. means connected to said circulating means for bypassing at least a portion of said fluid around said cooling means; and
   d. control means connected to said circulating means and said bypass means to control the volume of liquid passing through said cooling means and said bypass means, respectively, said control means comprising valve means connected to an electrical circuit including temperature sensing devices adapted to be in contact with the external auditory meatus and skin of said man and responsive to signals therefrom to position said valve means.

5. Apparatus as set forth in claim 4 in which there are four skin thermoelectric devices attached at the following locations: shoulder, chest, biceps and abdomen.

6. A process for automatically controlling the temperature of the liquid in a liquid cooled garment to minimize heat stress in the wearer comprising:
   a. measuring the core and skin temperatures of the wearer;
   b. producing electrical signals representative of said temperatures;
   c. producing from said signals a rate of temperature change signal and a temperature proportional signal; and
   d. using the rate of temperature change signal and the temperature proportional signal to control the proportions of warm and cool liquid flowing through the garment.

7. A process as set forth in claim 6 wherein:
said core temperature is measured at the external auditory meatus of the wearer.

8. A process as set forth in claim 7 where more than one skin temperature is measured.

* * * * *